(12) United States Patent
Murray et al.

(10) Patent No.: US 7,421,695 B2
(45) Date of Patent: Sep. 2, 2008

(54) SYSTEM AND METHODOLOGY FOR ADAPTIVE LOAD BALANCING WITH BEHAVIOR MODIFICATION HINTS

(76) Inventors: Christopher Murray, Church End Cottage, 18 Church Road, Barton le Clay, Bedfordshire MK45 4LA (GB); John Zamick, Caraway House, Templars Way, Shipman, Somerset BS251RB (GB)

( * ) Notice: Subject to any disclaimer, the term of this patent is extended or adjusted under 35 U.S.C. 154(b) by 808 days.

(21) Appl. No.: 10/712,130

(22) Filed: Nov. 12, 2003

(65) Prior Publication Data
US 2005/0102393 A1    May 12, 2005

(51) Int. Cl.
G06F 15/173    (2006.01)

(52) U.S. Cl. .............. 718/105; 718/104; 718/100; 709/223; 709/224

(58) Field of Classification Search .......... 709/226, 709/237, 225, 229, 201, 203, 223, 224; 455/517; 370/352; 726/14; 718/105, 104, 100
See application file for complete search history.

(56) References Cited

U.S. PATENT DOCUMENTS

| | | | |
|---|---|---|---|
| 4,621,359 A | 11/1986 | McMillen | |
| 5,155,851 A | 10/1992 | Krishnan | |
| 5,239,649 A | 8/1993 | McBride et al. | |
| 5,341,477 A | 8/1994 | Pitkin et al. | |
| 5,404,515 A | 4/1995 | Chasse et al. | |
| 5,444,848 A | 8/1995 | Johnson, Jr. et al. | |
| 5,537,542 A | 7/1996 | Eilert et al. | |
| 5,544,327 A | 8/1996 | Dan et al. | |
| 5,596,720 A | 1/1997 | Hamada et al. | |
| 5,774,660 A | 6/1998 | Brendel et al. | |
| 5,774,668 A | 6/1998 | Choquier et al. | |
| 5,828,847 A | 10/1998 | Gehr et al. | |
| 5,864,535 A | 1/1999 | Basilico | |
| 5,881,238 A | 3/1999 | Aman et al. | |
| 5,915,095 A | 6/1999 | Miskowiec | |
| 5,954,795 A | 9/1999 | Tomita et al. | |
| 6,003,079 A | 12/1999 | Friedrich et al. | |
| 6,023,722 A | 2/2000 | Colyer | |
| 6,078,960 A | 6/2000 | Ballard | |
| 6,185,601 B1 | 2/2001 | Wolff | |
| 6,219,790 B1 * | 4/2001 | Lloyd et al. | 726/14 |
| 6,259,705 B1 | 7/2001 | Takahashi et al. | |

(Continued)

OTHER PUBLICATIONS

C. de Laat, et al., "Generic AAA Architecture," Aug. 2000, Network Working Group, Request for Comments: 2903, http://www.ietf.org/rfc/rfc2903.txt?number=2903, data retrieved Mar. 2, 2004, pp. 1-23.

(Continued)

*Primary Examiner*—Le Luu
(74) *Attorney, Agent, or Firm*—Hickman Palermo Truong & Becker

(57) ABSTRACT

The invention provides techniques for adaptive load balancing. Techniques are provided for monitoring a server's operating conditions; determining, based on the server's operating conditions, when to send a behavior modification hint to one or more clients that are being served by the server; generating the behavior modification hint based on the server's operating conditions; and sending the behavior modification hint to the one or more clients. A client receives the behavior modification hint and, based on the behavior modification hint, alters a timeout value related to the server or alters its preferred server.

34 Claims, 5 Drawing Sheets

U.S. PATENT DOCUMENTS

| | | | |
|---|---|---|---|
| 6,263,368 B1 | 7/2001 | Martin | |
| 6,330,231 B1 | 12/2001 | Bi | |
| 6,401,121 B1 | 6/2002 | Yoshida et al. | |
| 6,539,445 B1 | 3/2003 | Krum | |
| 6,778,528 B1 * | 8/2004 | Blair et al. | 370/352 |
| 7,159,234 B1 | 1/2007 | Murphy et al. | |
| 7,185,045 B2 | 2/2007 | Ellis et al. | |
| 7,231,445 B1 * | 6/2007 | Aweya et al. | 709/226 |
| 2002/0040402 A1 * | 4/2002 | Levy-Abegnoli et al. | 709/229 |
| 2002/0161891 A1 * | 10/2002 | Higuchi et al. | 709/226 |
| 2002/0194335 A1 * | 12/2002 | Maynard | 709/225 |
| 2003/0009698 A1 | 1/2003 | Lindeman et al. | |
| 2003/0158933 A1 | 8/2003 | Smith | |
| 2003/0217285 A1 | 11/2003 | Sanchez Herrero et al. | |
| 2004/0024861 A1 | 2/2004 | Coughlin | |
| 2004/0132473 A1 * | 7/2004 | Mir et al. | 455/517 |

OTHER PUBLICATIONS

J. Vollbrecht, et al., "AAA Authorization Framework," Aug. 2000, Network Working Group, Request for Comments: 2904, http://www.ietf.org/rfc/rfc2904.txt?number=2904, data retrieved Mar. 2, 2004, pp. 1-31.

G. Zorn, "Microsoft Vendor-specific RADIUS Attributes," Mar. 1999, Network Working Group, Request for Comments: 2548, http://www.ietf.org/rfc/rfc2548.txt?number=2548, data retrieved Mar. 2, 2004, pp. 1-36.

C. Rigney, et al., "Remote Authentication Dial in User Service (RADIUS)," Jun. 2000, Network Working Group, Request for Comments: 2865, http://www.ietf.org/rfc/rfc2865.txt?number=2865, data retrieved Mar. 2, 2004, pp. 1-67.

C. Rigney, "RADIUS Accounting," Jun. 2000, Network Working Group, Request for Comments: 2866, http://www.ietf.org/rfc/rfc2866.txt?number=2866, data retrieved Mar. 2, 2004, pp. 1-25.

G. Zorn, et al., "RADIUS Accounting Modifications for Tunnel Protocol Support," Jun. 2000, Network Working Group, Request for Comments: 2867, http://www.ietf.org/rfc/rfc2867.txt?number=2867, data retrieved Mar. 2, 2004, pp. 1-10.

G. Zorn, et al., "RADIUS Attributes for Tunnel Protocol Support," Jun. 2000, Network Working Group, Request for Comments: 2868, http://www.ietf.org/rfc/rfc2868.txt?number=2868, data retrieved Mar. 2, 2004, pp. 1-18.

B. Aboba, "IANA Considerations for RADIUS (Remote Authentication Dial in User Service)," Jun. 2003, Network Working Group, Request for Comments: 3575, http://www.ietf.org/rfc/rfc3575.txt?number=3575, data retrieved Mar. 2, 2004, pp. 1-8.

M. Chiba, et al., "Dynamic Authorization Extensions to Remote Authentication Dial in User Service (RADIUS)," Jul. 2003, Network Working Group, Request for Comments: 3576, http://www.ietf.org/rfc/rfc3576.txt?number=3576, data retrieved Mar. 2, 2004, pp. 1-27.

L. Blunk, et al., "PPP Extensible Authentication Protocol (EAP)," Mar. 1998, Network Working Group, Request for Comments: 2284, http://www.ietf.org/rfc/rfc2284.txt?number=2284, data retrieved Mar. 2, 2004, pp. 1-14.

B. Aboba, et al., "PPP EAP TLS Authentication Protocol," Oct. 1999, Network Working Group, Requests for Comments: 2716, http://www.ietf.org/rfc/rfc2716.txt?number=2716, data retrieved Mar. 2, 2004, pp. 1-22.

B. Aboba, et al., "Authentication, Authorization and Accounting (AAA) Transport Profile," Jun. 2003, Network Working Group, Request for Comments: 3539, http://www.ietf.org/rfc/rfc3539.txt?number=3539, data retrieved Mar. 2, 2004, pp. 1-36.

B. Aboba, et al., "RADIUS (Remote Authentication Dial in User Service) Support for Extensible Authentication Protocol (EAP)," Sep. 2003, Network Working Group, Request for Comments: 3579, http://www.ietf.org/rfc/rfc3579.txt?number=3579, data retrieved Mar. 2, 2004, pp. 1-41.

P. Congdon, et al., "IEEE 802.1x Remote Authentication Dial in User Service (RADIUS) Usage Guidelines," Sep. 2003, Network Working Group, Request for Comments: 3580, http://www.ietf.org/rfc/rfc3580.txt?number=3580, data retrieved Mar. 2, 2004, pp. 1-27.

P. Calhoun, et al., "Diameter Base Protocol," Sep. 2003, Network Working Group, Request for Comments: 3588, http://www.ietf.org/rfc/rfc3588.txt?number=3588, data retrieved Mar. 2, 2004, pp. 1-129.

K. Zeilenga, "Lightweight Directory Access Protocol version 3 (LADAPv3): All Operational Attributes," Dec. 2003, Network Working Group, Request for Comments: 3673, http://www.ietf.org/rfc/rfc3673.txt?number=3673, data retrieved Mar. 2, 2004, pp. 1-5.

K. Zeilenga, "Feature Discovery in Lightweight Directory Access Protocol (LDAP)," Dec. 2003, Network Working Group, Request for Comments: 3674, http://www.ietf.org/rfc/rfc3674.txt?number=3674, data retrieved Mar. 2, 2004, pp. 1-5.

L. Howard, "An Approach for Using LDAP as a Network Information Service," Mar. 1998, Network Working Group, Request for Comments: 2307, http://www.ietf.org/rfc/rfc2307.txt?number=2307, data retrieved Mar. 2, 2004, pp. 1-19.

International Search Report and Written Opinion in international application PCT/US04/37072 corresponding to U.S. Appl. No. 10/712,130, published by USPTO and WIPO, Oct. 10, 2007, 13 pages.

S. Varma, Letter, Canadian Intellectual Property Office, Ottawa, Canada, Mar. 4, 2008, 3 pages.

* cited by examiner

SYSTEM AND METHODOLOGY FOR ADAPTIVE LOAD BALANCING WITH BEHAVIOR MODIFICATION HINTS

FIELD OF THE INVENTION

The present invention relates to load balanced servers in a network. The invention specifically relates to adaptive load balancing.

BACKGROUND OF THE INVENTION

In a client-server computer system, clients rely on servers to provide needed services. In the simplest form of these systems, a single server serves multiple clients. If this is the case, then any degradation in the quality of service (QoS) provided by the server, or failure of the server, will result in poor or failed service at each of its clients.

In many cases, however, this single point of failure is unacceptable. Therefore, systems are often built such that multiple servers are available to service clients, and clients are able to change ("failover") from one server to another. For example, if a client detects that a server fails to respond, then the client can failover to another server providing the same service.

One approach for detecting the need for failover is to use a timeout mechanism configured on the client. In this timeout approach, given a particular request, the client will wait time T for a response from the server and will retry the request R times, again waiting time T for each retry. In a situation where the server cannot respond in time T to the request, either because the server is down (has failed), or the QoS has degraded, then the client waits for a total time of R*T without a response to the request and then fails over to another server.

A problem with the timeout approach is that the client wastes the total time to failover of R*T. Another problem with the timeout approach is that failover time is constant for a particular client. In many cases, a server's speed of response is dictated by the server's operating conditions, including network conditions. In the timeout approach, the client's timeout value does not adapt and therefore the client's QoS suffers under changing conditions.

A second problem with the timeout approach is that it increases network traffic. Depending on implementation, O(R) messages per client will be passed when failover is needed.

Once a server has "timed out" a predefined number of times for a particular client, the client fails over to a second server. This second server is typically chosen from a preconfigured list of alternative servers on the client. A problem with this configured failover approach is that the choice of server to which to failover is based on a fixed list and not on network conditions or the operating conditions of the original server or the servers to which the client could failover.

Another approach is to use a load balancer to handle failover. A load balancer routes messages between clients and servers, acting as a single point of contact for multiple clients and allowing those clients to be served by multiple servers. In many cases, a client must be served by the same server for all related messages. In such cases, the load balancer must make client-server relationships "sticky" even when using a stateless protocol such as hypertext transfer protocol (HTTP) that does not inherently support maintaining long-duration connections of clients to servers. A load balancer makes a client-server session sticky by either keeping state for each client session, thereby keeping track of the routing of messages between clients and servers, or otherwise determining, for each message for each client-server relationship, to which client-server relationship that message corresponds.

A problem with the load balancer approach is that the implementations of stickiness algorithms are computationally expensive, memory intensive, and difficult to deploy. A related problem with the load balancer approach is that it requires at least one separate process, the load balancer. If a client could failover correctly on its own, then there would be no need for a load balancer and load balanced client-server systems as a whole could be simpler.

Another problem with the load balancer approach is that determining the server to which to failover is based on a preconfigured list on the load balancer and not on network conditions or the operating conditions of the original server or the servers to which the client could failover.

From the above Background and in the upcoming description it will be clear that there is a need for a system for adaptive load balancing that overcomes the problems of clients failing over to alternative servers without considering the first servers operating conditions, including network conditions, or the other server's operating conditions; and needing a separate process for load balancing.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
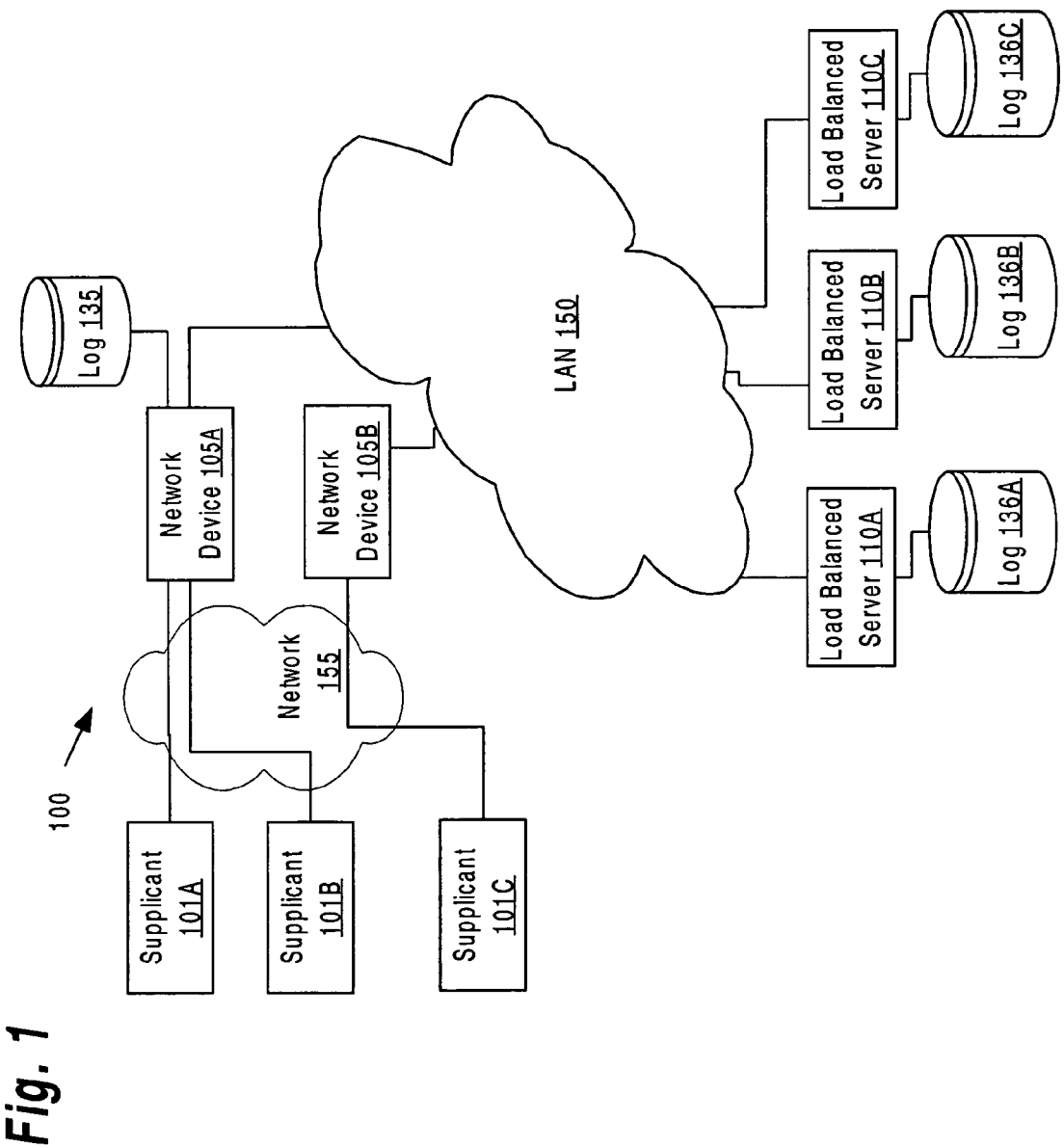
FIG. 1 depicts a block diagram of example architectural components and layout of a load balanced system.

A method and apparatus for adaptive load balancing is described. In the following description, for the purposes of explanation, numerous specific details are set forth in order to provide a thorough understanding of the present invention. It will be apparent to one with ordinary skill in the art, however, that the present invention may be practiced without these specific details. In other instances, well-known structures and devices are shown in block diagram form in order to avoid unnecessarily obscuring the present invention.

1.0 General Overview
2.0 Structural Overview
3.0 Functional Overview
3.1 Operating Conditions
3.2 Determining When to Send a Behavior Modification Hint 3.3 Reacting to a Behavior Modification Hint
3.4 An Example Embodiment of Adaptive Load Balancing for an AAA Server
3.5 Functional Architecture
4.0 Hardware Overview
5.0 Extentions and Alternatives

1.0 General Overview

The needs identified in the foregoing Background, and other needs and objects that will become apparent for the following description, are achieved in the present invention, which comprises, in one aspect, a method for adaptive load balancing including the steps of monitoring a server's operating conditions; determining, based on the server's operating conditions, when to send a behavior modification hint to one or more clients that are being served by the server; generating the behavior modification hint based on the server's operating conditions; and sending the behavior modification hint to the one or more clients. In a related feature, the server is an AAA server and the one or more clients are AAA clients. In a related feature, the step of sending the behavior modification hint comprises sending a RADIUS message containing the behavior modification hint in a vendor specific attribute within the RADIUS message.

In a related feature, the step of sending the behavior modification hint comprises sending a particular message containing the behavior modification hint to a particular client of the one or more clients, where the particular message is a response message to a request message sent by the particular client to the server. In a related feature, the step of monitoring the server's operating conditions comprises monitoring at least one of average transaction request processing time, CPU usage percentage, memory usage percentage, network conditions, and number of processes running.

In a related feature, the method further includes the step of determining the one or more clients to which to send the message based on a predefined list of clients. In a related feature, the method further includes the step of determining the one or more clients to which to send the message based on a network device group. In a related feature, the method further includes the step of determining the one or more clients to which to send the message based on operating conditions for the server relative to each of the one or more clients. In a related feature, the server is one of multiple servers providing a particular service; the behavior modification hint comprises a suggestion of one or more alternative servers; and the method further comprises the step of determining the one or more alternative servers based on the set of operating conditions for each server of the multiple servers. In a related feature, the step of determining the one or more alternative servers further comprises the server obtaining the operating conditions of the multiple servers over a network.

In a related feature, the step of determining when to send a behavior modification hint is based on network conditions of a network providing communication between the server and the one or more clients, where the network conditions comprise at least one of ping time from the server to a computer on the network; round trip time of a message sent to a particular client; quality of service guaranteed to one or more clients; and operating conditions of a device on the network used to route messages. In a related feature, the step of sending a behavior modification hint further comprises the steps of sending a code to the one or more clients; and generating the code based on why it was determined to send a message to the one or more clients. In a related feature, the step of determining when to send a behavior modification hint is based on a scheduled event related to the server. In a related feature, the scheduled event related to the server is selected from the group consisting of server shutdown, server maintenance, and server backup. In a related feature, the step of determining when to send a behavior modification hint is based on a server detecting that a particular client has sent one or more retry messages, where a retry message is a second or subsequent message corresponding to a particular request for service from a particular client.

In another aspect, techniques are provided for a method for adaptive load balancing including the steps of receiving a behavior modification hint from a first server providing a first service, where the behavior modification hint comprises the first server's operating conditions; and altering one or more functional aspects of a client based on the behavior modification hint, where the one or more functional aspects of the client comprise at least one of a configured timeout value for the first server for the first service and a preferred server setting for the first service. In a related feature, the step of receiving a behavior modification hint comprises receiving a particular message containing the behavior modification hint from the first server, where the particular message is sent by the first server in response to a request message sent by the client to the first server.

In a related feature, the step of altering one or more functional aspects of a client comprises altering the configured timeout value for the first server for the first service. In a related feature, the method further includes the step of generating a new timeout value based on the first server's operating conditions. In a related feature, the behavior modification hint contains a list of one or more alternative servers and the step of altering one or more functional aspects of a client comprises altering the preferred server setting for the first service based on the list of one or more alternative servers. In a related feature, a second server is one of the servers in the list of one or more alternative servers and the method further comprises the step of connecting to the second server. In a related feature, the method further includes the step of generating a new timeout value based on the second server's operating conditions.

In a related feature, the step of receiving a behavior modification hint further comprises the steps of receiving a RADIUS message containing the behavior modification hint in a Vendor Specific Attribute (VSA) within the RADIUS message and interpreting the behavior modification hint contained within the RADIUS message.

In another aspect, a computer-readable medium carrying one or more sequences of instructions which, when executed by one or more processors, causes the one or more processors to perform any of the foregoing steps.

2.0 Structural Overview

FIG. 1 depicts a block diagram of example architectural components and layout of a load balanced system.

One or more supplicants 101A, 101B, 101C are communicatively coupled to network devices 105A, 105B. In one embodiment, communication of supplicants 101A, 101B, 101C with network devices 105A, 105B is over a network 155. In various embodiments, the network 155 is a wireless network, dial up access, the Internet, a local area network (LAN), or any other communication network. In various embodiments, the network device 105A, 105B are wireless access points, virtual private network devices, network access servers, switches, routers, or any other appropriate devices.

The network devices 105A, 105B are communicatively coupled to a LAN 150. In various embodiments, the LAN 150 is a wireless network, dial up access, the Internet, or any other appropriate communications network. The network device 105A is also communicatively coupled to a log 135. In various embodiments, the log is a database, a flat file, or any other appropriate storage.

One or more servers 110A, 110B, 110C are communicatively coupled to the LAN 150 and to respective logs 136A, 136B, 136C. In various embodiments, the servers are AAA servers, application servers, database servers, or any other servers that can support load balancing. According to one embodiment of the techniques herein described, the servers 110A, 110B, and 110C are AAA servers and the network devices 105A, 105B are AAA clients.

Consider this example of a functioning system of FIG. 1. Network device 105A acts as an access regulator for a supplicant 101A, controlling what the supplicant 101A can reach in the rest of the system 100. The network device 105A accounts for all of the activity that passes through it via a log 135. When supplicant 101A requests a service from a server 110A in the system 100, the network device 105A communicates with the servers 110A to forward the request from supplicant 101A through the LAN 150. All activity at the server 110A is accounted for in a log 136A.

3.0 Functional Overview

The following functional description assumes no particular hardware, operating system, software system, or other detail of an implementation. Additionally, the flow diagrams presented are examples of possible algorithmic flow and in no way limit the scope of the invention. Embodiments of the invention can be practiced in many ways in many disparate hardware and software environments and using different algorithmic flow.

One approach herein uses a preemptive method to indicate to clients that services from the server are going to degrade or fail and that the clients should alter their expectations of that server or failover to alternative servers.

3.1 Operating Conditions

As will be described in more detail below, in various embodiments, a server sends a behavior modification hint based on the operating conditions of the server. The operating conditions include any aspect of the server itself or its network environment that can affect the server's ability to serve a client. In one embodiment, a server's operating conditions comprise detecting that a particular client has sent one or more retry messages, where a retry message is a second or subsequent message corresponding to a particular request for service. In various embodiments, a server's operating conditions include average transaction time for a particular type of request for the server or average transaction time for a particular type of request for one or more other servers to which the server is communicatively coupled. In various embodiments, a server's operating conditions comprise CPU (central processing unit) usage percentage, memory usage percentage, network conditions, or number of processes running. In related embodiments, network conditions are computed as the round trip time for a particular request less the transaction time for the particular request or network ping time between the client and server.

In one embodiment, a server's operating conditions is computed relative to a particular client. For example, in the context of FIG. 1, where the server 110A is an AAA server and the network device 105A is an AAA client, the AAA server 110A determines CPU usage, which is a parameter relative to all clients, and network ping time relative to network device 105A.

In various embodiments, a server's operating conditions may include the schedule for server shutdown, server maintenance, server backup or any other scheduled event related to the server. In one embodiment, a server's operating conditions include operating conditions of one or more other servers to which the server is communicatively coupled. In various related embodiments, the server obtains the operating conditions of the one or more other servers over a network, via file transfer protocol (FTP), via HTTP, secure HTTP (HTTPS), TCP/IP (Transaction Control Protocol/Internet Protocol) sockets, or other appropriate data transport mechanisms.

Some embodiments described herein determine whether the operating conditions of a server meet certain criteria. In various embodiments, determining whether operating conditions meet certain criteria comprises detecting whether a particular client has sent one or more retry messages, where a retry message is a second or subsequent message corresponding to a particular request for service; determining whether network ping time from the server to the client is over or under certain limits; determining whether average transaction time for a particular type of request for a server is over or under certain limits; or determining whether an average transaction time for a particular type of request for servers communicatively coupled to a particular server are over or under certain limits.

In various embodiments, determining whether operating conditions meet certain criteria comprises determining whether a server's CPU usage percentage is over or under certain limits, whether the server's memory usage percentage is over or under certain limits, whether the server's network conditions are better or worse than certain predefined thresholds, or whether the number of processes running on the server is over or under certain limits. In a related embodiment, determining whether the server's network conditions are above or below certain thresholds comprises comparing a predefined threshold to either a function of the round trip time for a particular request and the reported transaction time for the particular request or the ping time between a server and a client. In various embodiments, determining whether operating conditions meet certain criteria includes determining when the server will shutdown, have maintenance, perform a backup, or perform any other scheduled event related to the server.

In one embodiment, determining whether a particular server's operating conditions meet certain criteria comprises determining whether other communicatively coupled servers' operating conditions meet certain criteria. In various related embodiments, the server determines whether the other communicatively coupled servers' operating conditions meet certain criteria in part by obtaining the servers' operating conditions over a network, FTP, HTTP, HTTPS, TCP/IP sockets, or other appropriate data transport mechanisms.

3.2 Determining When to Send a Behavior Modification Hint

Figure 2:
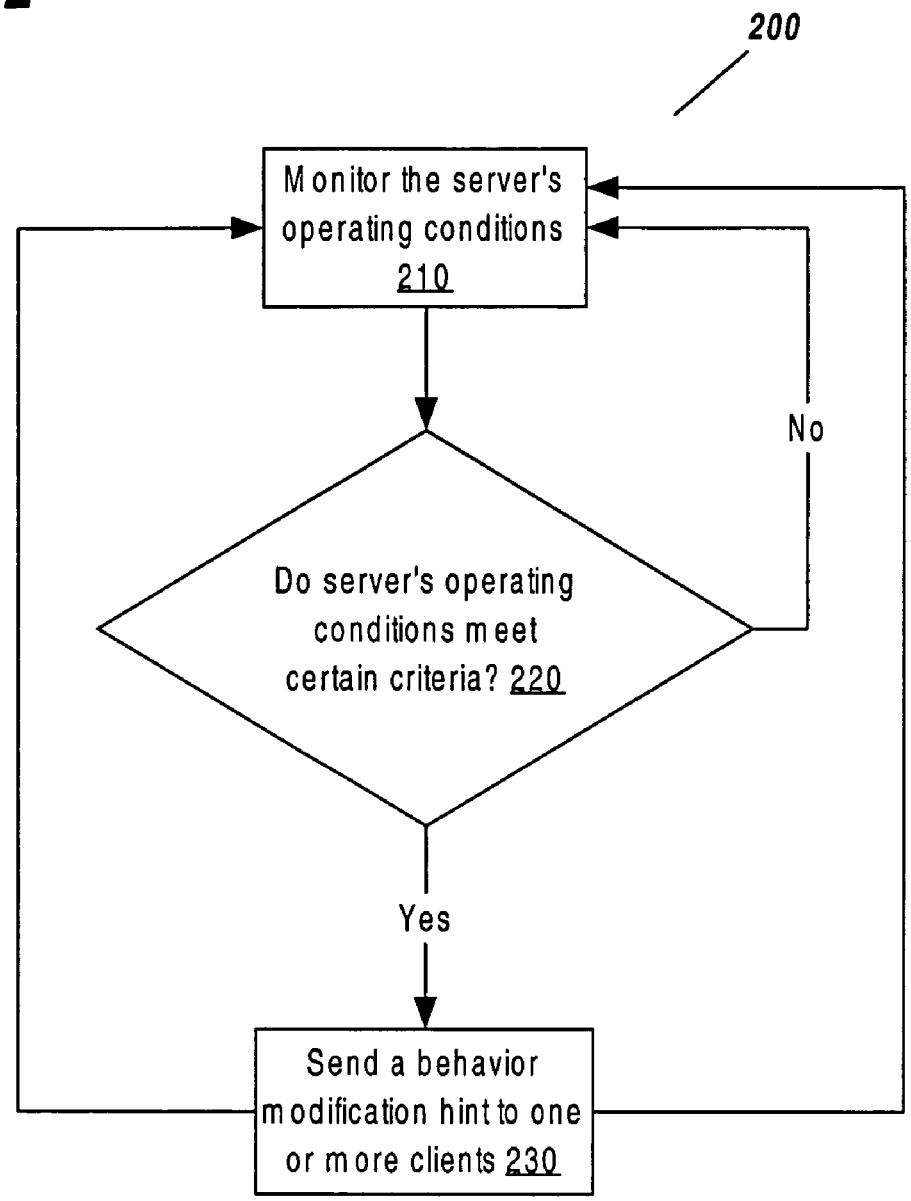
FIG. 2 depicts a flow diagram of an example method for determining when to send a behavior modification hint.

FIG. 2 depicts a flow diagram of an example method for determining when to send a behavior modification hint.

In step 210, a server's operating conditions are monitored. In one embodiment, a server monitors its own operating conditions. Alternatively, a process communicatively coupled to a server monitors the server's operating conditions.

In the context of FIG. 1, for example, a first server 110A monitors its own operating conditions and these operating conditions include one or more of CPU usage percentage, memory usage percentage, network conditions, number of processes running, and knowledge of the server's 110A maintenance cycles of server 110A. The server's operating conditions also comprise the operating conditions of servers 110B and 110C, which server 110A obtains using TCP/IP sockets.

Whether the operating conditions meet certain criteria is tested in step 220. In one embodiment, step 220 includes determining whether the operating conditions of one or more other servers meet certain criteria, where the other servers are communicatively coupled to the first server.

In various embodiments, step 220 includes determining whether CPU usage is over a certain percentage, whether memory usage is over a certain percentage, whether network ping time is higher than a predefined limit, or whether the number of processes running is over a certain limit. In various embodiments, step 220 includes determining whether server shutdown, server maintenance, server backup or any other scheduled event related to the server could affect the ability to serve clients.

In the context of FIG. 1, for example, a server 110A determines whether its own operating conditions meet certain criteria, and the operating conditions include one or more of CPU usage percentage, memory usage percentage, network conditions, number of processes running, and knowledge of the maintenance cycles. Determining whether the server's operating conditions meet certain criteria also includes determining whether the operating conditions of servers 110B and 110C meet certain criteria. In this example, the server 110A determines whether servers 110B or 110C are in an operating condition suitable for servicing clients.

If a server's operating conditions meet certain criteria, then a behavior modification hint is sent to one or more clients at step 230. In this context, a behavior modification hint is any indication by which server suggests to clients that services from the server are going to degrade or fail and that the clients should alter their expectations of that server or failover to alternative servers. In one embodiment, the behavior modification hint is sent to a client from a server in a message that is sent in response to a request from the client to the server.

In one embodiment, in which server 110A is a AAA server, sending the behavior modification hint comprises sending a Remote Authentication Dial-In User Service (RADIUS) message containing therein a RADIUS Vendor Specific Attribute (VSA) containing the behavior modification hint. In various embodiments, the behavior modification hint is included as part of a message in Terminal Access Controller Access Control System (TACACS++) or Diameter protocols. However, the specific mechanism used to send the hint is not critical.

In various embodiments, determining the one or more clients to which to send the behavior modification hint is based on a predefined list of clients, a network device group, operating conditions for the server relative to each of the one or more clients, or on network conditions. In related embodiments, the network conditions comprise ping time from the server to a computer on the network; round trip time of a message sent to a particular client; quality of service guaranteed to one or more clients; or operating conditions of a device on the network used to route messages.

In one embodiment, the server is one of multiple servers providing a particular service; in this arrangement, the server knows the operating conditions of each of the multiple servers and a suggestion of one or more alternative servers from among the multiple servers is sent along with the behavior modification hint. In a related embodiment, the suggestion of one or more alternative servers is based on the operating conditions of each server of the multiple servers. In various embodiments, the behavior modification hint is sent to one client of the multiple clients a server serves, a proper subset of the multiple clients the server serves, or to all clients the server serves. In one embodiment, one or more reason codes are sent with the behavior modification hint. The reason codes indicate a reason why the server is providing a behavior modification hint. These reason codes are determined based on which operating conditions met which criteria. Client-side software or other mechanisms may use the reason codes to determine how to process the behavior modification hint.

In the context of FIG. 1, for example, a server 110A sends a behavior modification hint to all of its clients in order to inform them that the server's memory usage is over a certain limit, and the behavior modification hint includes a reason code corresponding to the memory usage being over a certain limit. The behavior modification hint also includes a list of alternative servers 110B and 110C and their operating conditions.

After a behavior modification hint is sent to one or more clients in step 230, or if a server's operating conditions do not meet certain criteria in step 220, then the server's operating conditions are monitored, step 210. In one embodiment, the server's performance is continually monitored.

Various embodiments of FIG. 2 overcome the need for a client to use only a timeout mechanism for failover and allows servers or processes communicatively coupled thereto to indicate to clients or processes communicatively coupled thereto the state of operating conditions for the server, reasons for sending behavior modification hints, and a list of alternative servers to which the clients can failover and eliminate the need for a separate process to perform load balancing. These indications enable a client to make an informed decision about when and to which server to failover. Moreover, various embodiments reduce the network traffic associated with timeout, failover, and reconnection.

Whereas FIG. 2 depicts a certain flow of events, the invention is not limited to these steps or this flow. Additional steps could be performed, steps could be left out, and the steps could be performed in parallel or in a different order.

3.3 Reacting to a Behavior Modification Hint

Figure 3:
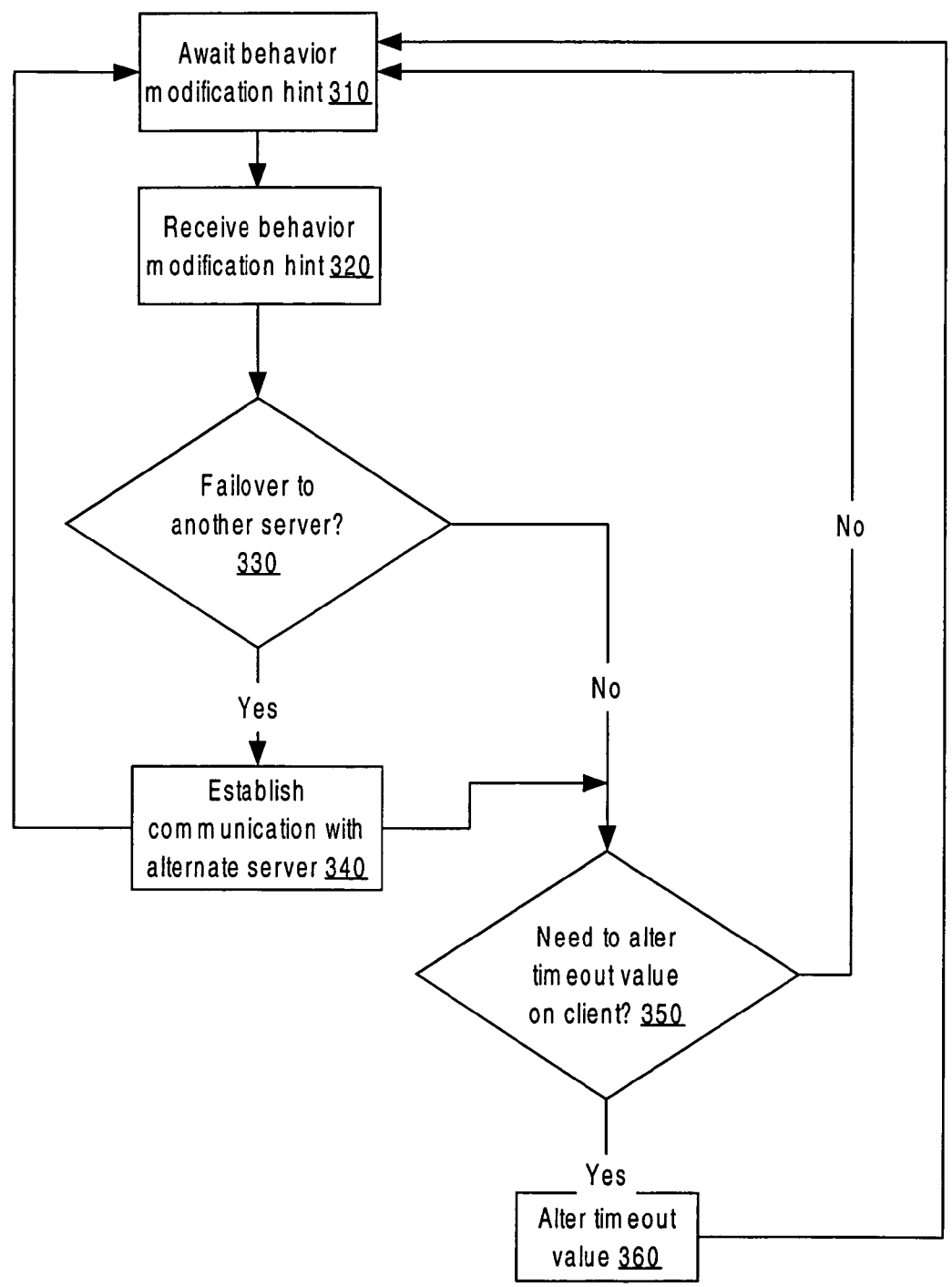
FIG. 3 depicts a flow diagram of an example method for determining appropriate reaction to a behavior modification hint.

FIG. 3 depicts a flow diagram of an example method for determining appropriate reaction to a behavior modification hint.

A behavior modification hint is awaited in step 310. In various embodiments, a client awaits receiving a behavior modification hint as part of a message in any appropriate protocol, such as RADIUS, TACACS+, or Diameter. In various embodiments, a client awaits receipt of a behavior modification hint or a process thereto communicatively coupled awaits arrival of a behavior modification hint at the client. In one embodiment, a client awaits a behavior modification hint after sending a request for service to a server. In a related embodiment, the client awaits the behavior modification hint at least in part by investigating the responses sent by the server. For example, in the context of FIG. 1 where the server 110A is an AAA server, a network device 105A, an AAA client, awaits receipt of a behavior modification hint by investigating the contents of the Vendor Specific Attributes in RADIUS messages sent in response to the client's request for service.

Once the behavior modification hint has arrived, it is received, step 320. In various embodiments, receiving a behavior modification hint includes receiving the behavior modification hint via a network connection from a server or a process communicatively coupled to a server or polling for the behavior modification hint at a known location and downloading the behavior modification hint over an appropriate network connection. In one embodiment, receiving the behavior modification hint includes storing the behavior modification hint in a computer readable medium communicatively coupled to a client.

In one embodiment, the behavior modification hint includes operating conditions. In related embodiments, the behavior modification hint contains information regarding whether the server's operating conditions meet certain criteria. In various embodiments, accompanying or contained within the behavior modification hint is one or more reason codes corresponding to the reason(s) the behavior modification hint was sent.

For example, in the context of FIG. 1 where the server 110A is an AAA server, a network device 105A, an AAA client, receives a behavior modification hint from a server 110A which contains information about the server's operating condition and suggests alternative servers is stored in a memory communicatively coupled to the client.

Once the behavior modification hint is received in step 320, then a check is made to determine whether the client needs to failover to another server, step 330. In various embodiments, the decision whether to failover is based on the operating conditions of the server that sent the behavior modification hint, an estimated time that the client would have to wait for service from the server; or the operating conditions of other servers which could provide the same service as the server which sent the behavior modification hint. In related embodiments, the operating conditions include any of the operating conditions described above. In a related embodiment, the estimated time that the client would have to wait for service from the server is based on a function of the operating conditions of the server. In one embodiment, the client makes the decision to failover based on an estimate of how long the server would take to service the client and how long each of one or more alternative servers would take to service the client.

For example, in the context of FIG. 1 where the server 110A is an AAA server, a network device 105A, an AAA client, determines whether it needs to failover based on the operating conditions of the server 110A. Specifically, the network device 105A bases the decision on whether the server's 110A CPU usage is over a predefined limit and whether the server's 110A network ping time is over a certain predefined limit.

If it is determined to failover to another server in step 330, then a connection is established to an alternative server in step 340. In one embodiment, step 340 comprises setting a preferred server setting on a client and the client using the preferred server setting to determine to which server to send the message. In various embodiments, step 340 comprises connecting to a server over a network or sending a message to a server. In various embodiments, a client chooses the alternative server based on the operating conditions of the server; based on a preconfigured list to which the client has access; or based on a list of one or more suggested alternatives contained in the behavior modification hint in step 310.

For example, in the context of FIG. 1 where the server 110A is an AAA server, a network device 105A, an AAA client, which received a behavior modification hint from server 110A containing operating conditions of servers 110A, 110B, 110C in step 320, determines that it needs to failover based on the operating conditions of the server 110A. Then the network device 105A determines that it will failover to the server 110B based on the operating conditions of server 110B and server 110C.

After the client has failed over in step 340, or if no failover is needed in step 330, a decision is made whether to alter a timeout value on a client, step 350. In one embodiment, the decision whether to alter a timeout value is based on the operating conditions of the server that sent the behavior modification hint. In another embodiment, the decision whether to alter a timeout value is based on the operating conditions of the server to which the client failed over in step 340.

For example, in the context of FIG. 1 where the server 110A is an AAA server, a network device 105A, an AAA client, decides whether to alter a timeout value related to requests to a server 110A based on whether the server's 110A CPU usage is over a predefined limit and whether the network ping time is over a certain predefined limit. The network device 105A increases the timeout value in order to wait a longer, more appropriate amount of time for a response from the server, which is under a heavy processing load, or because of network latency problems as indicated by the high client-server ping time.

If there is a need to alter the timeout value, then the timeout value is altered at a client in step 360. In various embodiments, altering the timeout value at a client includes changing a value stored in a computer readable medium that specifies the timeout values for all servers, changing a value stored in a computer readable medium that specifies the timeout value for the server that sent the behavior modification hint to the client; changing the amount of time that the client will wait for a particular response to a particular query from the server; or changing the amount of time that the client will wait for a particular type of service provided by a particular server. In one embodiment, altering the timeout value includes determining a new timeout value based on the operating conditions of the server. In related embodiments, determining the new timeout value comprises performing a functional composition on one or more aspects the server's operating condition.

For example, in the context FIG. 1 where the server 110A is an AAA server, a network device 105A, an AAA client, increases a timeout value associated with a particular service provided by a particular server 110A based on the server's 110A CPU usage being over a predefined limit and the server's 110A network ping time being over a certain predefined limit. The new timeout value is based on an estimate of how long the particular server will take to complete the particular service.

Various embodiments of FIG. 3 enable clients to react to the operating conditions of the servers which serve them. The clients, based on these operating conditions and behavior modification hints from the servers, can determine whether it is appropriate to wait longer for a response to a request sent to a server and when they should failover to an alternative server. Moreover, a client can choose the alternative server intelligently based on the operating conditions of these alternative servers, suggestions by the current server, or predefined lists. Moreover, various embodiments eliminate the need for a separate load balancing process and reduce the network traffic associated with timeout value, failover, and reconnection.

Whereas FIG. 3 depicts a certain flow of events, the invention is not limited to these steps or this flow. Additional steps could be performed, steps could be left out, and the steps could be performed in parallel or in a different order.

3.4 An Example Embodiment of Adaptive Load Balancing for an AAA Server

An example system with load balanced authentication, authorization, and accounting (AAA) servers according to one embodiment of the techniques described herein and clients is described for purposes of illustrating a clear example, but other embodiments, some of which are described above, are possible. AAA servers provide the following services to clients in that environment:

Authentication: Validating the claimed identity of an end user or a device, such as a host, server, switch, router, etc.

Authorization: Granting access rights to a user, groups of users, system, or a process.

Accounting: Establishing who, or what, performed a certain action, such as tracking user connection and logging system users.

A network device 105A, an AAA client, sends an auth-request packet as provided in the RADIUS protocol to a load balanced AAA server 110A. Upon receipt of this request the AAA server 110A determines that the operating conditions it has been monitoring (step 210) meet certain criteria (step 220), which indicate that the server should send a behavior modification hint to the network device 105A in step 230. The AAA server 110A constructs a RADIUS auth-accept message with the behavior modification hint included in a RADIUS Vendor Specific Attribute in a key-value format that the client can parse. The behavior modification hint includes the AAA server's 110A CPU usage, which is higher than a predefined threshold; the server 110A to network device 105A ping time, which is higher than a predefined threshold; a suggestion of an alternative AAA server 110B; and the alternative server's 110B CPU usage. This message containing a behavior modification hint is sent to the network device 105A (230).

The network device 105A, which had been awaiting the reply to a request (step 310), receives the RADIUS auth-accept message from the AAA server 110A (step 320). The network device 105A parses and interprets the behavior modification hint in the Vendor Specific Attribute of the RADIUS auth-accept message and determines, based on the AAA server's 110A CPU usage and ping time, that the network device 105A needs to failover to another server (step 330). The network device 105A chooses to failover to AAA server 110B based on the CPU usage information for AAA server 110B passed in the behavior modification hint. The network device 105A fails over to the AAA server 110B, in part, by sending the server a RADIUS auth-request message (step 340).

The network device 105A then increases the timeout value associated with the RADIUS auth-request sent to AAA server 110B message because the CPU usage of AAA server 110B being over a certain threshold (step 350)—that information having been received in the behavior modification hint in step 320. Subsequently, the network device 105A awaits a RADIUS auth-accept message and a behavior modification hint (step 310) from the AAA server 110B.

3.5 Functional Architecture

Figure 4:
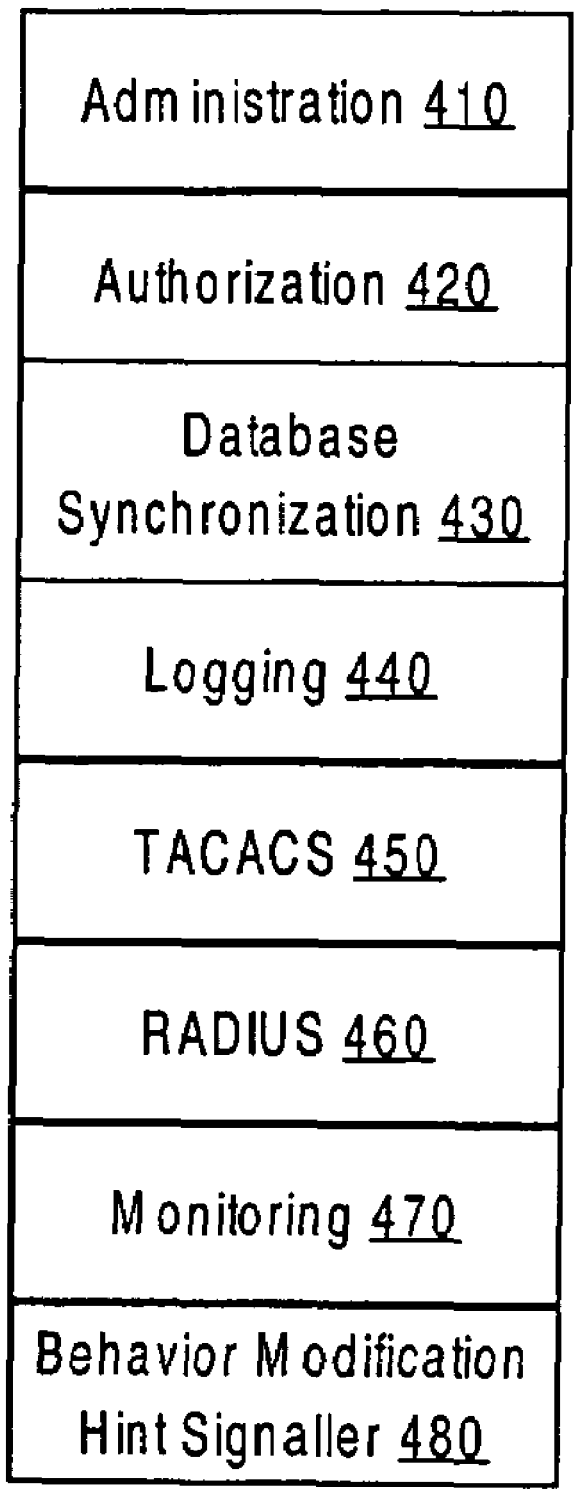
FIG. 4 depicts a block diagram of example architectural elements of a load balanced authentication, authorization, and accounting (AAA) server that performs the foregoing steps.

FIG. 4 depicts a block diagram of example architectural elements of a load balanced AAA server that performs the foregoing steps.

In various embodiments, a server has multiple services. The administration service 410 provides a built-in web server for AAA administration of the multiple simultaneous sessions within the server. The authorization service 420 authenticates users, grants or denies service privileges, manages AAA databases, and handles external database authentication forwarding. The database synchronization service 430 manages database synchronization and replication to other AAA servers. The logging service 440 monitors and records user and administrator activities and activities related to backups and restoration, database replication, synchronizations, TACACS+ and RADIUS communication, VoIP activities, and any other service accounting needed. The TACACS+ service 450 and RADIUS service 460 handle communication and parsing of messages passed among devices and services.

The monitoring service 470, monitors status of AAA services and server resources, records and reports all critical errors to logs, sends e-mail alerts to administrators noting any potential problems, automatically detects and restarts AAA services, and scrutinizes login frequency of users.

The steps of FIG. 2 may be implemented in a behavior modification hint signaler 480. In various embodiments, the foregoing steps are performed by one or more of the services 410, 420, 430, 440, 450, 460, 470; are performed entirely by the service 480; or are performed by the service, 480, in combination with the services one or more of the services 410, 420, 430, 440, 450, 460, 470. For example, in the context of FIG. 1 where the server 110A is an AAA server, as part of the AAA server 110A, a monitoring service 470 provides information regarding the operating conditions of the AAA server 110A to a behavior modification hint signaler 480, and when the operating conditions meet certain criteria, the behavior modification hint signaler 480 constructs a behavior modification hint to be sent by the RADIUS service 460 in a VSA to one or more network devices 105A, 105B (AAA clients) to indicate that services from the server are going to degrade or fail and that the clients should alter their expectations of that server or failover to alternative servers.

The services listed in FIG. 4 do not assume any particular hardware configuration. The services can run as part of a single thread or process, can be separate threads or processes on the same physical computer, or can be running on multiple computers.

4.0 Hardware Overview

Figure 5:
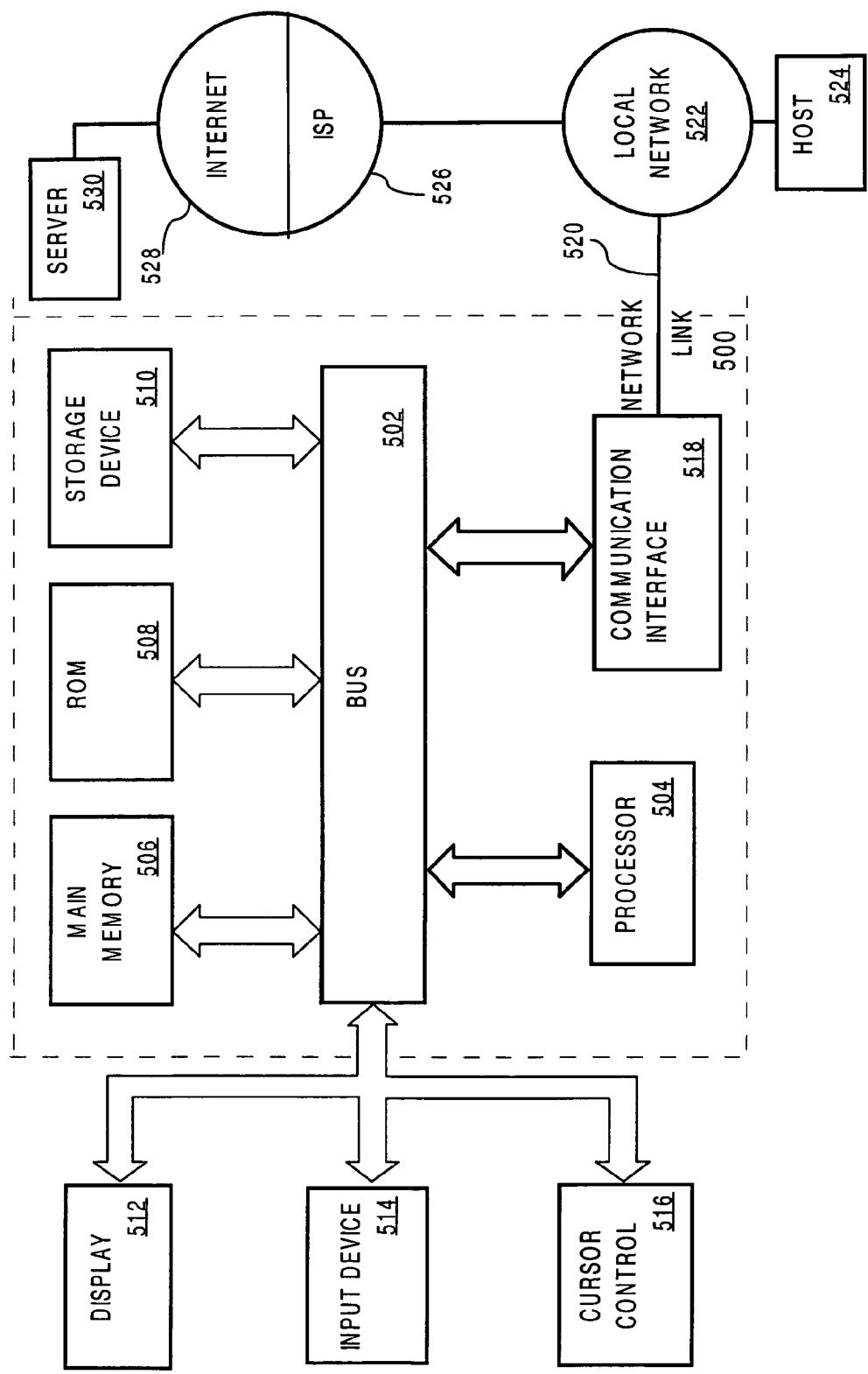
FIG. 5 is a block diagram that illustrates a computer system upon which an embodiment of the invention may be implemented.

FIG. 5 is a block diagram that illustrates a computer system upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for adaptive load balancing comprising the steps of:
    monitoring operating conditions of a server;
    determining, based on the operating conditions, whether to send a behavior modification hint to one or more clients that are served by the server;
    generating the behavior modification hint based on the operating conditions; and
    sending the behavior modification hint to the one or more clients;
    wherein the behavior modification hint comprises a suggestion of two or more alternative servers.

2. The method of claim 1, wherein the server is an AAA server and the one or more clients are AAA clients.

3. The method of claim 2, wherein the step of sending the behavior modification hint comprises sending a RADIUS message containing the behavior modification hint in a vendor specific attribute within the RADIUS message.

4. The method of claim 1, wherein the step of sending the behavior modification hint comprises sending a particular message containing the behavior modification hint to a particular client of the one or more clients, where the particular message is a response message to a request message sent by the particular client to the server.

5. The method of claim 1, wherein the step of monitoring the server's operating conditions comprises monitoring at least one of CPU usage percentage, memory usage percentage, network conditions, and number of processes running.

6. The method of claim 1, further comprising the step of determining the one or more clients to which to send the behavior modification hint based on a predefined list of clients.

7. The method of claim 1, further comprising the step of determining the one or more clients to which to send the behavior modification hint based on a network device group.

8. The method of claim 1, further comprising the step of determining the one or more clients to which to send the behavior modification hint based on operating conditions for the server relative to each of the one or more clients.

9. The method of claim 1, wherein the server is one of multiple servers providing a particular service; and the method further comprises the step of determining the two or more alternative servers based on operating conditions for each server of the two or more alternative servers.

10. The method of claim 9, wherein the step of determining the two or more alternative servers further comprises the server obtaining the operating conditions of the two or more alternative servers over a network.

11. The method of claim 1, wherein the step of determining when to send a behavior modification hint is based on network conditions of one or more networks providing communication between the server and the one or more clients, wherein the network conditions comprise at least one of:
- a ping time from the server to a computer on the one or more networks;
- a round trip time of a message sent to a particular client;
- a quality of service guaranteed to one or more clients; and
- operating conditions of a device on the one or more networks used to route messages.

12. The method of claim 1, wherein the step of sending a behavior modification hint further comprises the steps of:
- sending a code to the one or more clients; and
- generating the code based on why it was determined to send a message to the one or more clients.

13. The method of claim 1, wherein the step of determining when to send a behavior modification hint is based on a scheduled event related to the server.

14. The method of claim 13, wherein the scheduled event related to the server is selected from a group consisting of server shutdown, server maintenance, and server backup.

15. The method of claim 1, wherein the step of determining when to send a behavior modification hint is based on a server detecting that a particular client has sent one or more retry messages, wherein a retry message is a second or subsequent message corresponding to a particular request for service from the particular client.

16. A computer-readable storage medium storing one or more sequences of instructions for adaptive load balancing, which instructions, when executed by one or more processors, cause the one or more processors to carry out the steps of:
- monitoring operating conditions of a server;
- determining, based on the operating conditions, whether to send a behavior modification hint to one or more clients that are served by the server;
- generating the behavior modification hint based on the operating conditions; and
- sending the behavior modification hint to the one or more clients;
- wherein the behavior modification hint comprises a suggestion of two or more alternative servers.

17. An apparatus for adaptive load balancing, comprising:
- means for monitoring operating conditions of a server;
- means for determining, based on the operating conditions, whether to send a behavior modification hint to one or more clients that are served by the server;
- means for generating the behavior modification hint based on the operating conditions; and
- means for sending the behavior modification hint to the one or more clients;
- wherein the behavior modification hint comprises a suggestion of two or more alternative servers.

18. The apparatus of claim 17, wherein the server is an AAA server and the one or more clients are AAA clients.

19. The apparatus of claim 17, wherein the monitoring means comprises means for monitoring at least one of CPU usage percentage, memory usage percentage, network conditions, and number of processes running.

20. The apparatus of claim 17, wherein the server is one of multiple servers providing a particular service; and the apparatus further comprises means for determining the two or more alternative servers based on operating conditions for each server of the two or more alternative servers.

21. The apparatus of claim 17, wherein the means for determining comprises means for determining when to send a behavior modification hint based on network conditions of one or more networks providing communication between the server and the one or more clients, wherein the network conditions comprise at least one of:
- a ping time from the server to a computer on the one or more networks;
- a round trip time of a message sent to a particular client;
- a quality of service guaranteed to one or more clients; and
- operating conditions of a device on the one or more networks used to route messages.

22. The apparatus of claim 17, wherein the step of determining when to send a behavior modification hint is based on a scheduled event related to the server, wherein the scheduled event related to the server is selected from a group consisting of server shutdown, server maintenance, and server backup.

23. An apparatus for adaptive load balancing, comprising:
- a network interface that is coupled to a data network for receiving one or more packet flows therefrom;
- a processor;
- one or more stored sequences of instructions which, when executed by the processor, cause the processor to carry out the steps of:
  - monitoring operating conditions of a server;
  - determining, based on the operating conditions, whether to send a behavior modification hint to one or more clients that are served by the server;
  - generating the behavior modification hint based on the operating conditions; and
  - sending the behavior modification hint to the one or more clients;
  - wherein the behavior modification hint comprises a suggestion of two or more alternative servers.

24. The apparatus of claim 23, wherein the server is an AAA server and the one or more clients are AAA clients.

25. The apparatus of claim 24, wherein the instructions which when executed cause sending the behavior modification hint comprise instructions which when executed cause sending a RADIUS message containing the behavior modification hint in a vendor specific attribute within the RADIUS message.

26. The apparatus of claim 23, wherein the instructions which when executed cause sending the behavior modification hint comprise instructions which when executed cause sending a particular message containing the behavior modification hint to a particular client of the one or more clients, where the particular message is a response message to a request message sent by the particular client to the server.

27. The apparatus of claim 23, wherein the instructions which when executed cause monitoring the server's operating conditions comprise instructions which when executed cause monitoring at least one of CPU usage percentage, memory usage percentage, network conditions, and number of processes running.

28. The apparatus of claim 23, further comprising instructions which when executed cause determining the one or more clients to which to send the behavior modification hint based on a predefined list of clients.

29. The apparatus of claim 23, further comprising instructions which when executed cause determining the one or more clients to which to send the behavior modification hint based on a network device group.

30. The apparatus of claim 23, further comprising instructions which when executed cause determining the one or more clients to which to send the behavior modification hint based on operating conditions for the server relative to each of the one or more clients.

31. The apparatus of claim 23, wherein the server is one of multiple servers providing a particular service; and the apparatus further comprises instructions which when executed cause determining the two or more alternative servers based on operating conditions for each server of the two or more alternative servers.

32. The apparatus of claim 23, wherein instructions which when executed cause determining when to send a behavior modification hint is based on network conditions of one or more networks providing communication between the server and the one or more clients, wherein the network conditions comprise at least one of:

a ping time from the server to a computer on the one or more networks;

a round trip time of a message sent to a particular client;

a quality of service guaranteed to one or more clients; and operating conditions of a device on the one or more networks used to route messages.

33. The apparatus of claim 23, wherein the step of determining when to send a behavior modification hint is based on a scheduled event related to the server, wherein the scheduled event related to the server is selected from a group consisting of server shutdown, server maintenance, and server backup.

34. The apparatus of claim 23, wherein the step of determining when to send a behavior modification hint is based on a server detecting that a particular client has sent one or more retry messages, wherein a retry message is a second or subsequent message corresponding to a particular request for service from the particular client.

* * * * *

UNITED STATES PATENT AND TRADEMARK OFFICE
CERTIFICATE OF CORRECTION

PATENT NO. : 7,421,695 B2  Page 1 of 1
APPLICATION NO. : 10/712130
DATED : September 2, 2008
INVENTOR(S) : Christopher Murray et al.

It is certified that error appears in the above-identified patent and that said Letters Patent is hereby corrected as shown below:

Title page, item [73] assignee should read as follows:

Cisco Technology, Inc.
San Jose, California (US)

Signed and Sealed this

Twenty-fourth Day of February, 2009

JOHN DOLL
*Acting Director of the United States Patent and Trademark Office*